United States Patent [19]

Hamilton

[11] Patent Number: 5,502,119
[45] Date of Patent: Mar. 26, 1996

[54] STABILIZED POLYESTER-POLYCARBONATE COMPOSITIONS

[75] Inventor: Douglas G. Hamilton, Mt. Vernon, Ind.

[73] Assignee: General Electric Company, Pittsfield, Mass.

[21] Appl. No.: 396,353

[22] Filed: Feb. 28, 1995

Related U.S. Application Data

[63] Continuation of Ser. No. 984,766, Dec. 3, 1992, abandoned.

[51] Int. Cl.$^6$ ........................................... C08F 20/00
[52] U.S. Cl. ..................... 525/439; 528/272; 528/275; 528/279; 528/280; 528/281; 528/282; 528/283; 528/285; 528/308; 528/308.6; 525/437; 525/446; 525/461; 525/464; 524/81; 524/261; 524/539
[58] Field of Search ...................... 528/272, 275, 528/279, 280, 281, 282, 283, 285, 308, 308.6; 525/437, 439, 446, 461, 464; 524/81, 261, 539

[56] References Cited

U.S. PATENT DOCUMENTS

| | | | |
|---|---|---|---|
| 4,401,804 | 8/1983 | Wooten et al. | 528/272 |
| 4,532,290 | 7/1985 | Jaquiss et al. | 524/417 |
| 4,794,141 | 12/1988 | Paul et al. | 525/92 |
| 5,025,066 | 6/1991 | DeRudder et al. | 525/66 |

FOREIGN PATENT DOCUMENTS

| | | |
|---|---|---|
| 65777 | 12/1982 | European Pat. Off. . |
| 230047A | 7/1987 | European Pat. Off. . |
| 279678A | 6/1990 | Germany . |
| 58-187450A | 11/1983 | Japan . |
| 61-203164A | 9/1986 | Japan . |
| 62-158753A | 7/1987 | Japan . |
| 1284549 | 11/1989 | Japan . |
| 2112177A | 4/1990 | Japan . |

*Primary Examiner*—Samuel A. Acquah

[57] ABSTRACT

A polyester-polycarbonate composition comprising (A) at least one polyester prepared by the reaction of at least one alkanediol with at least one dicarboxylic acid or dialkyl ester thereof in the presence of a metallic catalyst, (B) at least one polycarbonate, (C) at least one organosilicate, the organosilicate being present in an amount effective to inhibit ester-carbonate interchange in the composition, optionally, (D) an organic or inorganic colorant, (E) an impact modifier, and (F) a stabilizer. A method for stabilizing polyester-polycarbonate compositions against ester-carbonate interchange is also provided.

20 Claims, No Drawings

STABILIZED POLYESTER-POLYCARBONATE COMPOSITIONS

This is a continuation of Ser. No. 07/984,766, filed on Dec. 3, 1992, now abandoned.

BACKGROUND OF THE INVENTION

The present invention relates to polycarbonate-polyester compositions. More particularly, the present invention relates to improved polyester-polycarbonate compositions stabilized against ester-carbonate interchange.

Polyester-polycarbonate compositions are widely used in industry. However, a disadvantage of these compositions is their tendency to undergo ester-carbonate interchange, wherein ester linkages in both the polycarbonate and the polyester are believed to be broken and replaced by alkylene carbonate and aryl carboxylate bonds. The result is degradation of the physical properties of the polymers due to hybridization of the molecular linkages therein. This in turn leads to variability in the final fabricated article.

It is believed that the ester-carbonate interchange in polyester-polycarbonate compositions is promoted by metallic catalyst residues present in the polyester. These residues are left over from the polymerization reaction forming the polyester, wherein certain metal compounds are used as polymerization catalysts. It appears, however, that these metal compounds also catalyze the transesterification reaction between the polycarbonate and the polyester.

It would be desirable to provide a compound which deactivates the metallic catalyst residues present in the polycarbonate/polyester compositions. The resulting polyester-polycarbonate compositions would be improved in that they would have a decreased tendency to undergo ester-carbonate interchange and therefore would be stable against such interchange.

It is known in the art that certain phosphorous-containing inorganic compounds are useful in deactivating metallic catalyst residues. Reference is made, for example, to U.S. Pat. Nos. 4,532,290 (Jaquiss et al.) and 4,401,804 (Wooten et al.).

Copending, commonly assigned U.S. Patent Application Docket Number 8CV-5282, filed Jun. 2, 1992, to Douglas G. Hamilton (Serial Number not yet assigned) discloses the use of silyl phosphates to deactive metallic catalyst residues in polyester-polycarbonate compositions.

The present invention is based on the discovery that certain organoorthosilicates compounds will effectively deactivate metallic catalyst residues in a polycarbonate-polyester composition.

SUMMARY OF THE INVENTION

The present invention provides a polyester-polycarbonate composition comprising (A) at least one polyester prepared by the reaction of at least one alkanediol with at least one dicarboxylic acid or dialkyl ester thereof in the presence of a metallic catalyst, (B) at least one polycarbonate, the sum of the weight of (A) and (B) being 100 parts by weight; and (C) at least one organosilicate having the general formula $(R)_a(R^1O)_b Si$ or $(R^2)_c(R^3O)_d SiO\text{-}[\text{-}(Si(R^4)_e(OR^5)_fO)_h\text{-}(Si(R^6)_j(R^7)_kO)_l]_n Si(R^8O)_p(R^9)_q$ or

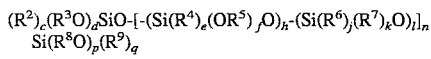

wherein $0 \leq a \leq 3$; $1 \leq b \leq 4$; $a+b=4$; $0 \leq c \leq 3$; $c+d=3$; $0 \leq e \leq 2$; $0 \leq f \leq 2$; $e+f=2$; $0 \leq h \leq 20$; $0 \leq j \leq 2$; $0 \leq k \leq 2$; $j+k=2$; $0 \leq l \leq 20$; $0 \leq n \leq 100$; $0 \leq p \leq 3$; $0 \leq q \leq 3$; $d+f+p>0$; $p+q=3$; R, $R^1$, $R^2$, $R^3$, $R^4$, $R^5$, $R^6$, $R^7$, $R^8$, and $R^9$ are each independently H, an alkyl radical having 1–20 carbon atoms, an aryl radical having 6–20 carbon atoms, an alkylaryl radical having 1–20 carbon atoms, an alkenyl radical having 1–20 carbon atoms, or halogenated derivatives of the foregoing; wherein the organosilicate is present in an amount sufficient to substantially inhibit ester-carbonate interchange in the composition.

In the composition and method of this invention, the organosilicate substantially deactivates the metallic catalyst residues so that the residues lose their ability to catalyze a transesterification reaction between the polycarbonate and the polyester.

DETAILED DESCRIPTION OF THE INVENTION

The term "metallic catalyst" and "metal catalyst" as used herein refers to those metal compounds which are known to be useful as catalysts in the preparation of polyesters. Examples of such catalysts include organic or inorganic compounds of arsenic, cobalt, tin, antimony, zinc, titanium, magnesium, calcium, manganese, gallium, sodium, lithium, and the like. Titanium compounds are frequently used. Examples of these include the tetraalkyl titanates, such as tetraisopropyl titanate and tetra(2-ethylhexyl)titanate. Metallic catalysts useful in the preparation of polyesters are described, for example, in U.S. Pat. No. 4,401,804 (Wooten et al.), which is hereby incorporated by reference herein.

Component A in the composition of this invention is at least one polyester. The polyesters present in the composition and used in the method of this invention are poly(alkylene dicarboxylates), which normally comprise repeating units of the formula $$-O-R^{10}-O-\overset{O}{\underset{\|}{C}}-R^{11}-C- \qquad (I)$$

wherein $R^{10}$ is a saturated divalent aliphatic, alicyclic, or aryl radical containing about 2 to about 10 carbon atoms and preferably about 2 to about 6 carbon atoms, and $R^{11}$ is a divalent aliphatic, alicyclic, or aryl radical containing about 2 to about 20 and preferably about 6 to about 20 carbon atoms.

Examples of radicals represented by $R^{10}$ include ethylene, propylene, trimethylene, pentamethylene, hexamethylene, dimethylenecyclohexane, tetramethylene, and 1,4-cyclohexylene. The straight-chain radicals are preferred, especially ethylene, trimethylene, and tetramethylene, but branched radicals are also contemplated.

The poly(alkylene dicarboxylate) used in this invention is preferably a polyalkylene terephthalate or a polycyclohexylterephthalate. Preferably, it is a polyalkylene terephthalate, and, most preferably, poly(ethylene terephthalate) ("PET") or poly(butylene terephthalate) ("PBT"), with PBT being more preferred than PET. It usually has a number average molecular weight in the range of about 10,000–70,000, as determined by gel permeation chromatography or by intrinsic viscosity at 30° C. in a mixture of 60% (by weight) phenol and 40% 1,1,2,2-tetrachloroethane.

The polyesters used in this invention are prepared by the reaction of at least one alkenediol of the formula HO-$R^{10}$-OH with at least one dicarboxylic acid of the formula HOOC-$R^{11}$-COOH or derivatives thereof, such as, for example, dialkyl esters, diacid chlorides, carboxylic acid salts, and diaryl esters. The dicarboxylic acid may be an aliphatic acid such as succinic, glutaric, adipic, sebacic, azelaic, suberic acid, or cyclohexane dicarboxylic acid; or an aromatic acid such as isophthalic acid, terephthalic acid, naphthyl dicarboxylic acid, or biphenyl dicarboxylic acid. The aromatic acids, especially terephthalic acid, are preferred. The use of an ester and especially a lower alkyl ester is preferred, the term "lower alkyl" denoting alkyl groups having up to 7 carbon atoms, preferably, a methyl, ethyl, or butyl ester. The reaction between the alkenediol and the dicarboxylic acid is typically promoted by a metallic catalyst, examples of which were provided previously herein.

Further suitable reagents for forming polyesters are described, for example, in the following U.S. Patent Nos., all of which are hereby incorporated by reference herein: 2,465,319; 2,720,502; 2,727,881; 2,822,348; 3,047,539.

For the preparation of the polyester, the dicarboxylic acid or ester thereof, alkenediol and metallic catalyst are typically heated in the range of about 180°–300° C. for a period of time sufficient to produce the desired polyester. The mole ratio of diol to acid or ester is typically from about 1:1 to about 1.4:1 and preferably from about 1.2:1 to about 1.3:1, the excess diol being useful to drive the reaction to completion. The amount of metallic catalyst used is typically about 0.005–0.2 percent by weight, based on the amount of acid or ester.

For component B, the term "polycarbonate" as used herein embraces those polycarbonates comprising repeating units of the formula

(II)

wherein Y is a divalent aromatic radical derived from a dihydroxyaromatic compound of the formula HO-Y-OH. Typical dihydroxyaromatic compounds are 2,2-bis-(4-hydroxyphenyl)propane, also known as bisphenol A; bis(4-hydroxyphenyl)methane; 2,2-bis(4-hydroxy-3-methylphenyl)propane; 4,4-bis(4-hydroxyphenyl)heptane; 2,2-(3,5,3', 5'-tetrachloro-4,4'-dihydroxyphenyl)propane; 2,2-(3,5,3',5'-tetrabromo-4,4'-dihydroxyphenol)propane; 3,3'-dichloro-4, 4'-dihydroxydiphenyl)methane; 2,2'-dimethyl-4-methylcyclohexyl bisphenol A; cyclododecyl bisphenol A; cyclohexyl bisphenol, and 2,2'-dihydroxydiphenylsulfone, and 2,2'-dihydroxyldiphenylsulfide. Most preferably, Y is a 2,2-bis-(4-hydroxyphenyl)propyl radical, in which case, the polycarbonate is a "bisphenol A polycarbonate".

Methods for preparing polycarbonates are known in the art and are described, for example, in U.S. Pat. No. 4,452,933, which is hereby incorporated by reference herein. Known processes for polycarbonate preparation include melt processes and interfacial polymerization. Polycarbonates can be prepared, for example, by reacting the dihydroxyaromatic compound with a carbonate precursor such as phosgene, a haloformate or a carbonate ester, a molecular weight regulator, an acid acceptor and a catalyst.

Examples of suitable carbonate precursors include carbonyl bromide, carbonyl chloride, and mixtures thereof; diphenyl carbonate; a di(halophenyl)carbonate, e.g., di(trichlorophenyl) carbonate, di(tribromophenyl) carbonate, and the like; di(alkylphenyl)carbonate, e.g., di(tolyl)carbonate; di(naphthyl)carbonate; di(chloronaphthyl)carbonate, or mixtures thereof; and bishaloformates of dihydric phenols.

Examples of suitable molecular weight regulators include phenol, cyclohexanol, methanol, alkylated phenols, such as octylphenol, para-tertiary-butyl-phenol, and the like. The preferred molecular weight regulator is phenol or an alkylated phenol.

The acid acceptor can be either an organic or an inorganic acid acceptor. A suitable organic acid acceptor is a tertiary amine and includes such materials as pyridine, triethylamine, dimethylaniline, tributylamine, and the like. The inorganic acid acceptor can be either a hydroxide, a carbonate, a bicarbonate, or a phosphate of an alkali or alkaline earth metal.

The catalyst which can be used are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonate may also be a copolyestercarbonate as described in U.S. Pat. Nos. 3,169,121; 3,207,814; 4,194,038; 4,156,069; 4,430,484, 4,465,820, and 4,981,898, all of which are incorporated by reference herein.

Copolyestercarbonates useful in this invention are available commercially. They are typically obtained by the reaction of at least one dihydroxyaromatic compound with a mixture of phosgene and at least one dicarboxylic acid chloride, especially isophthaloyl chloride, terephthaloyl chloride, or both.

The ratio of polyester to polycarbonate is not critical to the present invention, and may be determined by the individual practitioner of this invention. Typically, the weight ratio of polyester to polycarbonate will range from about 99:1 to about 1:99, preferably from about 95:5 to about 5:95, and most preferably is about 50:50.

The organosilicates (C) used in this invention are linear monomeric compounds of the general formula (III) $(R)_a(R^1O)_b Si$ 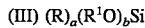

or linear polymeric compounds of the general formula (IV) 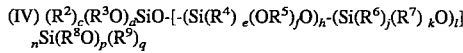

or cyclic compounds of the general formula

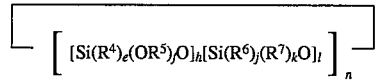

(V)

wherein $0 \leq a \leq 3$; $1 \leq b \leq 4$; a+b=4; $0 \leq c \leq 3$; c+d=3; $0 \leq e \leq 2$; $0 \leq f \leq 2$; e+f=2; $0 \leq h \leq 20$; $0 \leq j \leq 2$; $0 \leq k \leq 2$; j+k=2; $0 \leq l \leq 20$; $0 \leq n \leq 100$; $0 \leq p \leq 3$; $0 \leq q \leq 3$; d+f+p>0; p+q=3; R, $R^1$, $R^2$, $R^3$, $R^4$, $R^5$, $R^6$, $R^7$, $R^8$, and $R^9$ are each independently H, an alkyl radical having 1–20 carbon atoms, an aryl radical having 6–20 carbon atoms, an alkylaryl radical having 1–20 carbon atoms, an alkenyl radical having 1–20 carbon atoms, or halogenated derivatives of the foregoing; wherein the organosilicate is present in an amount sufficient to substantially inhibit ester-carbonate interchange in the composition.

Examples of radicals which can be represented by R and $R^1$ in formula (III) above include alkyl radicals, e.g., methyl, ethyl, and hexyl radicals; aryl radicals, e.g., phenyl, tolyl, resorcinyl, and cresyl radicals; aralkyl radicals, e.g., 2-ethylhexyl radicals; or alkenyl radicals; e.g., vinyl radicals. Preferably, $R^1$ is methyl or ethyl, and R is ethyl or phenyl.

Examples of preferred organosilicates which can be used in the composition and method of this invention include, for example, $Si(OCH_3)_4$, $Si(OCH_2CH_3)_4$, $Si(OCH_3)_2(OCH_2CH_3)_2$, $(CH_3)_3Si(OCH_2CH_3)(OPh)_2$, $(CH_3)Si(OCH_2CH_3)_3$, $(CH_3)_2Si(OCH_2CH_3)_2$, $(CH_3)_3Si(OCH_2CH_3)$, $Si(OCH_2CH_3)_3H$, $Si(OPh)_4$, poly(diethoxy)silicate; and poly(diethoxy)silicate; wherein Ph is a phenyl radical.

Most preferably, the organosilicate used in this invention is $Si(OPh)_4$ or $Si(OCH_2CH_3)_4$, wherein Ph is phenyl.

The organosilicates used in this invention can be prepared according to processes known in the art. Reference is made, for example, to W. Noll, "Chemistry and Technology of Silicones", 1968, Academic Press Inc., pp. 81–82, which is hereby incorporated by reference herein. These compounds are typically prepared by reacting organosilanes with alcohols or alkoxides where pyridine or tertiary amines are used as acid acceptors. The compounds can also be prepared by reacting tetra(organooxy)silanes with organometallic compounds, preferably Grignard compounds and organic derivatives of the alkali metals can be used.

The composition of this invention may further comprise (D) an inorganic or organic colorant, e.g., a dye or pigment. Examples of such colorants include the Ultramarine pigments, e.g., Ultramarine Blue; Ultramarine Violet; C.I. Pigment Red 187; and C.I. Pigment Red 187. It is to be understood, however, that, although the organosilicates are advantageous in compositions containing acid sensitive colorants, the organosilicates can also be used in compositions containing non-acid sensitive organic and inorganic colorants.

The polymeric composition of this invention may further contain (E) one or more agents to improve the impact strength, i.e., an impact modifier.

So-called core-shell polymers built up from a rubber-like core on which one or more shells have been grafted are preferably used. The core usually consists substantially of an acrylate rubber or a butadiene rubber. One or more shells have been grafted on the core. Usually these shells are built up for the greater part from a vinylaromatic compound and/or a vinylcyanide and/or an alkyl(meth)acrylate and/or (meth)acrylic acid. The core and/or the shell(s) often comprise multi-functional compounds which may act as a crosslinking agent and/or as a grafting agent. These polymers are usually prepared in several stages.

Olefin-containing copolymers such as olefin acrylates and olefin diene terpolymers can also be used as impact modifiers in the present compositions. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. They are commercially available such as, for example, EPSYN 704 from Copolymer Rubber Company. They are more fully described in U.S. Pat. No. 4,559,388, incorporated by reference herein.

Various rubber polymers and copolymers can also be employed as impact modifiers. Examples of such rubbery polymers are polybutadiene, polyisoprene, and various other polymers or copolymers having a rubbery dienic monomer.

Styrene-containing polymers can also be used as impact modifiers. Examples of such polymers are acrylonitrile-butadiene-styrene, styrene-acrylonitrile, acrylonitrile-butadiene-alpha-methylstyrene, styrene-butadiene, styrene butadiene styrene, diethylene butadiene styrene, methacrylate-butadiene-styrene, high rubber graff ABS, and other high impact styrene-containing polymers such as, for example, high impact polystyrene. Other known impact modifiers include various elastomeric materials such as organic silicone rubbers, elastomeric fluorohydrocarbons, elastomeric polyesters, the random block polysiloxane-polycarbonate copolymers, and the like. The preferred organopolysiloxane-polycarbonate block copolymers are the dimethylsiloxane-polycarbonate block copolymers.

The compositions of this invention may further contain (F) one or more stabilizers to protect the polymers from degradation due to heat or radiation by ultraviolet light. The term "stabilizers" as it relates to component (F) does not include the organosilicates described earlier herein. Satisfactory stabilizers for use as component (F) in the compositions of this invention comprise phenols and their derivatives; amines and their derivatives; compounds containing both hydroxyl and amine groups; polymeric phenolic esters and salts of multivalent metals in which the metal is in its lower state; and organophosphites including alkyl, aryl, alkylarylphosphites, and polyphosphites.

Representative phenol derivatives useful as stabilizers include 3,5-di-tert-butyl-4-hydroxy hydrocinnamic triester with 1,3,5-tris-(2-hydroxy ethyl-s-triazine- 2,4,6-(1H,3H,5H)trione; 4,4'-bis(2,6-ditertiary-butylphenyl); 1,3,5-trimethyl-2,4,6-tris( 3,5-ditertiary-butyl-4-hydroxybenzyl)benzene and 4,4'-butylidene-bis (6-tertiary-butyl-m-cresol). Mixtures of hindered phenols with esters of thiodiproprionic acid, mercaptides and phosphite esters are particularly useful. Additional stabilization to ultraviolet light can be obtained by compounding with various UV absorbers such as substituted benzophenones and/or benzotriazoles.

It is also within the scope of the invention to incorporate ingredients such as glass, reinforcing fibers, plasticizers, mold release agents, flame retardants, antioxidants, fillers such as clay, talc, and mica, and the like into the polycarbonate-polyester composition.

The polymeric composition of this invention can be obtained according to any conventional method of preparing polymer mixtures. The individual constituents are preferably mixed collectively in the melt (compounded) in an extruder. The extrudate (in strand form) which emanates from the extruder is chopped to pellets. The pellets may, for example, be further processed in an injection molding machine.

The present invention is also directed to a method for inhibiting the ester-carbonate interchange in a polyester-polycarbonate composition comprising components (A) and (B) described hereinabove, wherein the method comprises contacting the polyester-polycarbonate composition with (C) at least one organosilicate described hereinabove and present in an amount effective to inhibit ester-carbonate interchange in the composition, which are those amounts also provided hereinabove.

The following examples illustrate the present invention, but are not intended to limit the scope of the claims in any manner whatsoever. All parts are by weight unless otherwise specified.

EXPERIMENTAL

In the examples below, the following terms have the meanings set forth below:

"PBT" - a poly(butylene terephthalate) having a number average molecular weight, as determined by gel permeation chromatography, of about 50,000 and a melt viscosity of about 8500 poise at 250° C. Commercially available from General Electric Company under the designation VALOX® 315.

"PC" - a bisphenol A polycarbonate having a weight average molecular weight of about 68,000 and a melt flow of about 9.5 grams per 10 minutes at 300° C. Commercially available from General Electric Company under the designation LEXAN® 145.

"$T_m$" - crystalline melting point of a sample on the second scan of a DSC procedure wherein the sample is heated from 40° C. to 290° C. at 20° C. per minute, held for 15 minutes, cooled to 40° C. at 80° C. per minute, held for 10 minutes, and then heated from 40° C. to 290° C. at 20° C. per minute, after which the Tm is recorded.

"$\Delta H_m$" - crystalline heat of melting of a sample on the second scan of a DSC procedure wherein the sample is heated from 40° C. to 290° C. at 20° C. per minute, held for 15 minutes, cooled to 40° C. at 80° C. per minute, held for 10 minutes, and then heated from 40° C. to 290° C. at 20° C. per minute, after which the $\Delta H_m$ is recorded.

"KM653" - a methylmethacrylate butadiene styrene copolymer supplied by Rohm and Haas.

"Blendex 338" - an acrylonitrile butadiene styrene copolymer supplied by GE Specialty Chemicals.

"KM330" - a methylmethacrylate butylacrylate copolymer supplied by Rohm and Haas.

"B56" - a methylmethacrylate butadiene styrene copolymer supplied by Kaneka Corporation.

EXAMPLES 1–7 AND COMPARATIVE EXAMPLE A

Examples 1–7 illustrate the ability of alkyl and aryl silicates to stabilize PC/PBT blends. Specifically, tetraethyl orthosilicate (Example 1), tetraphenyl orthosilicate (Example 2), tetrakis(2-ethylhexyl)orthosilicate (Example 3), tetrakis(2-methoxyethyl)orthosilicate (Example 4), poly(diethoxy)siloxane (Example 5), phenyl triethoxysilane (Example 6), and diphenyldiethoxysilane (Example 7) are shown to be effective by the examples below. Comparative Example A illustrates the degree of instability of a blend which does not contain a stabilizer.

In Examples 1–7, compositions were prepared by co-extrusing PC and PBT in a vacuum-vented 30 mm WP twin screw operated at 480° F. (zone 1); 480° F. (zone 2); 480° F. (zone 3); 480° F. (zone 4); 480° F. (zone 5); and 480° F. (zone 6). The compositions contained a PC/PBT weight ratio of 50:50. The silicate materials were added to the compositions in the amounts indicated in Table I below.

In Comparative Example A, the procedure followed in Examples 1–7 was repeated except that no stabilizing additive was added to the composition.

The degree of stability of a PC/PBT composition and, consequently, the stabilizing ability of the stabilizer added, is indicated by the crystalline melting point and the crystalline heat of fusion of the compositions containing said additives.

The crystalline melting points and the crystalline heats of fusion are presented in Table I.

TABLE I

Examples 1–7 and Comparative Example A:
Crystalline Melting Points and the Crystalline Heats of Fusion

| Example | Amount | $T_m$ | $\Delta H_m$ |
|---|---|---|---|
| 1 | 0.5 | 218 | 26 |
| 2 | 0.5 | 218 | 24 |
| 3 | 0.5 | 217 | 25 |
| 4 | 0.5 | 220 | 24 |
| 5 | 0.5 | 218 | 25 |
| 6 | 0.6 | 212 | 22 |
| 7 | 0.65 | 204 | 17 |
| Comparative Example A | — | 191 | 8 |

The results of Examples 1–7 and Comparative Example A indicate that the sample containing the preferred materials are substantially more melt stable than the sample containing no stabilizer.

EXAMPLES 8–13 AND COMPARATIVE EXAMPLE B

Examples 8–13 illustrate the ability of alkyl and aryl silicates to stabilize PC/PBT blends containing impact modifiers. Specifically, tetrakis(2-ethylhexyl)orthosilicate (Example 8) in a blend containing KM653, tetraphenyl orthosilicate (Example 9) in a blend containing Blendex 338, poly(diethoxy)siloxane (Example 10) in a blend containing KM653, poly(diethoxy)siloxane (Example 11) in a blend containing Blendex 338, poly(diethoxy)siloxane (Example 12) in a blend containing B56, are shown to be effective. Comparative Example B illustrates the degree of instability of a blend which does not contain a stabilizer.

In Examples 8–13, compositions were prepared by co-extruding PC and PBT in a vacuum-vented 30 mm WP twin screw operated at 480° F. (zone 1); 480° F. (zone 2); 480° F. (zone 3); 480° F. (zone 4); 480° F. (zone 5); and 480° F. (zone 6). The compositions contained a PC/PBT/modifer/antioxidant ratio of 46/39/14/0.6. The silicate materials were added to the compositions in the amounts indicated in Table II below.

In Comparative Example B, the modifier used was KM 653 and the procedure followed in Examples 1–7 was repeated except that no stabilizing additive was added to the composition.

The degree of stability of a PC/PBT/modifier/antioxidant composition and, consequently, the stabilizing ability of the stabilizer added, is indicated by the crystalline melting point and the crystalline heat of fusion of the compositions containing said additives.

The crystalline melting points and the crystalline heats of fusion are presented in Table II.

TABLE II

Examples 8–13 and Comparative Example B:
Crystalline Melting Points and the Crystalline Heats of Fusion

| Example | Amount | $T_m$ | $\Delta H_m$ |
|---|---|---|---|
| 8 | 0.5 | 209 | 3 |
| 9 | 0.3 | 219 | 19 |
| 10 | 0.5 | 211 | 17 |
| 11 | 0.5 | 216 | 17 |
| 12 | 0.5 | 214 | 17 |
| 13 | 0.6 | 223 | 17 |
| Comparative Example B | — | Not Present | Not Present |

The results of Examples 8–13 and Comparative Example B indicate that the sample containing the preferred materials are substantially more melt stable than the sample containing no stabilizer.

EXAMPLE 14 AND COMPARATIVE EXAMPLE C

Example 14 illustrates the ability of alkyl and aryl silicates to stabilize PC/PBT/glass blends. Specifically, tetraphenyl orthosilicate (Example 14) is shown to be effective. Comparative Example C illustrates the degree of instability of a blend which does not contain a stabilizer.

In Example 14, compositions were prepared by co-extruding PC and PBT in a vacuum-vented 30 mm WP twin screw operated at 480° F. (zone 1); 480° F. (zone 2); 480° F. (zone 3); 480° F. (zone 4); 480° F. (zone 5); and 480° F. (zone 6). The compositions contained a PC/PBT/glass/antioxidant ratio of 22/46.25/30/1.55. The tetraphenyl orthosilicate was added to the composition at 0.3 parts per hundred (pph) parts by weight of the PC/PBT/glass/antioxidant.

In Comparative Example C, the procedure followed in Example 14 was repeated except that no stabilizing additive was added to the composition.

The degree of stability of a PC/PBT/glass/antioxidant composition and, consequently, the stabilizing ability of the stabilizer added, is indicated by the crystalline melting point and the crystalline heat of fusion of the compositions containing said additives.

The crystalline melting points and the crystalline heats of fusion are presented in Table III.

TABLE III

Example 14 and Comparative Example C:
Crystalline Melting Points and the Crystalline Heats of Fusion

| Example | $T_m$ | $\Delta H_m$ |
|---|---|---|
| 14 | 209 | 16 |
| Comparative Example C | Not Present | Not Present |

The results of Example 14 and Comparative Example C indicate that the sample containing the preferred material is substantially more melt stable than the sample containing no stabilizer.

What is claimed is:

1. A polyester-polycarbonate composition comprising (A) at least one polyester prepared by the reaction of at least one alkanediol with at least one dicarboxylic acid or dialkyl ester thereof in the presence of a metallic catalyst, (B) at least one polycarbonate, and (C) at least one organosilicate having the general formula

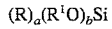

or

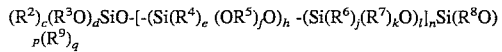

or

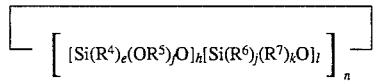

wherein $0 \leq a \leq 3$; $1 \leq b \leq 4$; $a+b=4$; $0 \leq c \leq 3$; $c+d=3$; $0 \leq e \leq 2$; $0 \leq f \leq 2$; $e+f=2$; $0 \leq h \leq 20$; $0 \leq j \leq 2$; $0 \leq k \leq 2$; $j+k=2$; $0 \leq l \leq 20$; $0 \leq n \leq 100$; $0 \leq p \leq 3$; $0 \leq q \leq 3$; $d+f+p>0$; $p+=3$; R, $R^1$, $R^2$, $R^3$, $R^4$, $R^5$, $R^6$, $R^7$, $R^8$, and $R^9$ are each independently H, an alkyl radical having 1–20 carbon atoms, an aryl radical having 6–20 carbon atoms, an alkylaryl radical having 1–20 carbon atoms, an alkenyl radical having 1–20 carbon atoms, or halogenated derivatives of the foregoing; wherein the organosilicate is present in an amount sufficient to substantially inhibit ester-carbonate interchange in the composition.

2. A composition according to claim 1 wherein each R independently represents an alkyl radical, an aryl radical, an aralkyl radical, or an alkenyl radical.

3. A composition according to claim 1 wherein the organosilicate is $Si(OCH_3)_4$, $Si(OCH_2CH_3)_4$, $Si(OCH_3)_2(OCH_2CH_3)_2$, $(CH_3)Si(OCH_2CH_3)(OPh)_2$, $(CH_3)Si(OCH_2CH_3)_3$, $(CH_3)_2Si(OCH_2CH_3)_2$, $(CH_3)_3Si(OCH_2CH_3)$, $Si(OCH_2CH_3)_3H$, or $Si(OPh)_4$, poly(diethoxy)silicate, wherein Ph is a phenyl radical.

4. A composition according to claim 1 wherein the organosilicate is $Si(OPh)_4$, $Si(OCH_2CH_3)_4$, or poly(diethoxy)silicate; wherein Ph is phenyl.

5. A composition according to claim 1 wherein the amount of organosilicate ranges from about 0.01 to about 10 parts by weight.

6. A composition according to claim 5 wherein the amount of organosilicate ranges from about 0.01 to about 5 parts by weight.

7. A composition according to claim 6 wherein the amount of organosilicate ranges from about 0.01 to about 1 part by weight.

8. A composition according to claim 1 wherein the polycarbonate is a bisphenol A polycarbonate and the polyester is polybutylene terephthalate.

9. A composition according to claim 1 wherein the metallic catalyst is an organic or inorganic compound selected from the group consisting of organic or inorganic compounds of arsenic, cobalt, tin, antimony, zinc, titanium, magnesium, calcium, manganese, gallium, sodium, and lithium.

10. A composition according to claim 9 wherein the metallic catalyst is a titanium compound.

11. A composition according to claim 10 wherein the titanium compound is tetraisopropyl titanate or tetra(2-ethylhexyl)titanate.

12. A composition according to claim 1 further comprising one or more of an organic or inorganic colorant; an impact modifier; a stabilizer; or glass.

13. A polyester-polycarbonate composition comprising (A) at least one polybutylene terephthalate prepared by the reaction of at least one alkanediol with at least one dicarboxylic acid or dialkyl ester thereof in the presence of a titanium compound catalyst; (B) at least one bisphenol A polycarbonate, (C) at least one organosilicate having the formula $Si(OPh)_4$ or $Si(OCH_2CH_3)_4$, wherein Ph is phenyl, (D) an inorganic or organic colorant, and (E) an impact modifier.

14. A composition according to claim 13 further comprising one or more of a stabilizer or glass.

15. A polyester-polycarbonate composition consisting essentially of: (A) at least one polyester prepared by the reaction of at least one alkanediol with at least one dicarboxylic acid or dialkyl ester thereof in the presence of a metallic catalyst, (B) at least one polycarbonate, and (C) at least one organosilicate having the general formula

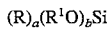

or

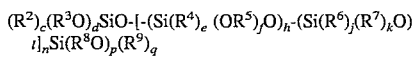

or

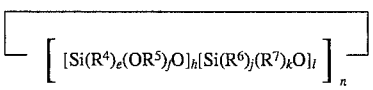

wherein $0 \leq a \leq 3$; $1 \leq b \leq 4$; $a+b=4$; $0 \leq c \leq 3$; $c+d=3$; $0 \leq e \leq 2$; $0 \leq f \leq 2$; $e+f=2$; $0 \leq h \leq 20$; $0 \leq j \leq 2$; $0 \leq k \leq 2$; $j+k=2$; $0 \leq l \leq 20$; $0 \leq n \leq 100$; $0 \leq p \leq 3$; $0 \leq q \leq 3$; $d+f+p>0$; $p+q=3$; R, $R^1$, $R^2$, $R^3$, $R^4$, $R^5$, $R^6$, $R^7$, $R^8$, and $R^9$ are each independently H, an alkyl radical having 1–20 carbon atoms, an aryl radical having 6–20 carbon atoms, an alkylaryl radical having 1–20 carbon atoms, an alkenyl radical having 1–20 carbon atoms, or halogenated derivatives of the foregoing; wherein the organosilicate is present in an amount sufficient to substantially inhibit ester-carbonate interchange in the composition.

16. A composition according to claim 15 further comprising one or more of an organic or inorganic colorant, an impact modifier, a stabilizer, or glass.

17. A method for inhibiting the ester-carbonate interchange in a polyester-polycarbonate composition comprising (A) at least one polyester prepared by the reaction of at least one alkanediol with at least one dicarboxylic acid or dialkyl ester thereof in the presence of a metallic catalyst, (B) at least one polycarbonate; wherein the method comprises contacting the polyester-polycarbonate composition with an effective amount of (C) at least one organosilicate having the general formula

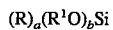

$(R)_a(R^1O)_b Si$ or

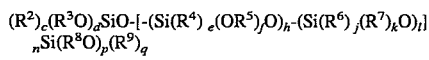

$(R^2)_c(R^3O)_d SiO\text{-}[\text{-}(Si(R^4)_e(OR^5)_fO)_h\text{-}(Si(R^6)_j(R^7)_kO)_l]_n Si(R^8O)_p(R^9)_q$ or

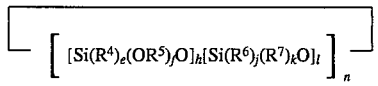

$[[Si(R^4)_e(OR^5)_fO]_h[Si(R^6)_j(R^7)_kO]_l]_n$ wherein $0 \leq a \leq 3$; $1 \leq b \leq 4$; $a+b=4$; $0 \leq c \leq 3$; $c+d=3$; $0 \leq e \leq 2$; $0 \leq f \leq 2$; $e+f=2$; $0 \leq h \leq 20$; $0 \leq j \leq 2$; $0 \leq k \leq 2$; $j+k=2$; $0 \leq l \leq 20$; $0 \leq n \leq 100$; $0 \leq p \leq 3$; $0 \leq q \leq 3$; $d+f+p>0$; $p+q=3$; R, $R^1$, $R^2$, $R^3$, $R^4$, $R^5$, $R^6$, $R^7$, $R^8$, and $R^9$ are each independently H, an alkyl radical having 1–20 carbon atoms, an aryl radical having 6–20 carbon atoms, an alkylaryl radical having 1–20 carbon atoms, an alkenyl radical having 1–20 carbon atoms, or halogenated derivatives of the foregoing; wherein the organosilicate is present in an amount sufficient to substantially inhibit ester-carbonate interchange in the composition.

18. A method according to claim 17 further comprising the step of combining the polyester-polycarbonate composition with one or more of an organic or inorganic colorant, an impact modifier, a stabilizer, or glass.

19. The polyester-polycarbonate composition of claim 1, wherein f is either 1 or 2.

20. The polyester-polycarbonate composition of claim 19, wherein f is 2.

* * * * *